US011245161B2

(12) United States Patent
Jung et al.

(10) Patent No.: US 11,245,161 B2
(45) Date of Patent: Feb. 8, 2022

(54) BATTERY MODULE WITH IMPROVED CONNECTION STRUCTURE BETWEEN ELECTRODE LEADS AND METHOD FOR MANUFACTURING THE SAME

(71) Applicant: LG Chem, Ltd., Seoul (KR)

(72) Inventors: Tai-Jin Jung, Daejeon (KR); Dal-Mo Kang, Daejeon (KR); Jeong-O Mun, Daejeon (KR); Byoung-Cheon Jeong, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/476,491

(22) PCT Filed: Mar. 5, 2018

(86) PCT No.: PCT/KR2018/002590
§ 371 (c)(1),
(2) Date: Jul. 8, 2019

(87) PCT Pub. No.: WO2018/186594
PCT Pub. Date: Oct. 11, 2018

(65) Prior Publication Data
US 2020/0303710 A1 Sep. 24, 2020

(30) Foreign Application Priority Data
Apr. 7, 2017 (KR) .................. 10-2017-0045410

(51) Int. Cl.
*H01M 50/502* (2021.01)
*F16B 35/00* (2006.01)
(Continued)

(52) U.S. Cl.
CPC ........... *H01M 50/502* (2021.01); *F16B 35/00* (2013.01); *H01M 10/0413* (2013.01);
(Continued)

(58) Field of Classification Search
CPC .. H01M 50/502; H01M 50/20; H01M 50/543; H01M 50/581; H01M 50/531;
(Continued)

(56) References Cited

U.S. PATENT DOCUMENTS 8,828,602 B2    9/2014  Ahn et al.
2012/0328908 A1* 12/2012  Han .................. H01M 50/502
                                              429/7

(Continued)

FOREIGN PATENT DOCUMENTS

CN      201323216 Y    10/2009
CN      102842695 A    12/2012
(Continued)

OTHER PUBLICATIONS

International Search Report from Application No. PCT/KR2018/002590 dated Sep. 5, 2018, 2 pages.
(Continued)

*Primary Examiner* — Matthew T Martin
(74) *Attorney, Agent, or Firm* — Lerner, David, Littenberg, Krumholz & Mentlik, LLP

(57) ABSTRACT

Provided is a battery module in which a connection structure between electrode leads is changed to prevent a heat generation phenomenon when overcharged and to allow easy connection and disconnection between secondary batteries, and a method for manufacturing the same. The battery module according to the present disclosure includes a secondary battery stack formed by stacking a plurality of secondary batteries having electrode leads, wherein each electrode lead protrudes from the corresponding secondary battery, and each electrode lead has a bent part, and the bent parts of opposite-polarity electrode leads of neighboring secondary batteries are stacked with an elastic body interposed therebetween, and the corresponding stacked part is (Continued)

fastened by an insulating bolt including a washer, with the elastic body being compressed.

14 Claims, 13 Drawing Sheets

(51) Int. Cl.
  *H01M 10/04* (2006.01)
  *H01M 10/42* (2006.01)
  *H01M 50/20* (2021.01)
  *H01M 50/543* (2021.01)
  *H01M 50/581* (2021.01)
(52) U.S. Cl.
  CPC ......... *H01M 10/425* (2013.01); *H01M 50/20* (2021.01); *H01M 50/543* (2021.01); *H01M 50/581* (2021.01); *H01M 2220/20* (2013.01)
(58) Field of Classification Search
  CPC ........... H01M 10/0413; H01M 10/425; H01M 2220/20; F16B 35/00; Y02E 60/10; Y02T 10/70
  See application file for complete search history.

(56) References Cited

U.S. PATENT DOCUMENTS

| | | |
|---|---|---|
| 2014/0370357 A1 | 12/2014 | Tatsumi et al. |
| 2016/0240833 A1 | 8/2016 | Yang et al. |
| 2017/0256775 A1* | 9/2017 | Wakimoto ........ H01M 10/0525 |

FOREIGN PATENT DOCUMENTS

| | | | | |
|---|---|---|---|---|
| CN | 104241584 | A | | 12/2014 |
| CN | 204155991 | U | | 2/2015 |
| CN | 105637671 | A | | 6/2016 |
| JP | 2008021486 | A | * | 8/2000 |
| JP | 2007035520 | A | | 2/2007 |
| JP | 2008021486 | A | | 1/2008 |
| JP | 2009187972 | A | | 8/2009 |
| JP | 2011108408 | A | | 6/2011 |
| JP | 201384368 | A | | 5/2013 |
| JP | 2015185223 | A | | 10/2015 |
| KR | 100993668 | B1 | | 11/2010 |
| KR | 20130030543 | A | | 3/2013 |
| KR | 101294179 | B1 | | 8/2013 |
| KR | 101449307 | B1 | | 10/2014 |
| KR | 20150028073 | A | | 3/2015 |
| KR | 20160094909 | A | | 8/2016 |
| KR | 20160129820 | A | | 11/2016 |
| KR | 20160129820 | A | * 11/2016 | .......... H01M 10/425 |
| KR | 20170004191 | A | | 1/2017 |

OTHER PUBLICATIONS

Extended European Search Report including the Written Opinion for Application No. EP 18781340.7 dated Feb. 13, 2020, 10 pages.

Chinese Search Report for Application No. 201880005995.7 dated Jun. 29, 2021, pp. 1-2.

* cited by examiner

BATTERY MODULE WITH IMPROVED CONNECTION STRUCTURE BETWEEN ELECTRODE LEADS AND METHOD FOR MANUFACTURING THE SAME

CROSS-REFERENCE TO RELATED APPLICATIONS

The present application is a national phase entry under 35 U.S.C. § 371 of International Patent Application No. PCT/KR2018/002590, filed on Mar. 5, 2018, published in Korean, which claims priority to Korean Patent Application No. 10-2017-0045410, filed on Apr. 7, 2017, the disclosures of which are hereby incorporated herein by reference.

TECHNICAL FIELD

The present disclosure relates to a battery module and a method for manufacturing the same, and more particularly, to a battery module with improved connection structure between electrode leads when constructing the battery module by connecting the electrode leads of a secondary battery and a method for manufacturing the same.

BACKGROUND ART

Recently, with the dramatically increasing demand for portable electronic products such as laptop computers, video cameras, mobile phones, and the like, along with the extensive development of electric vehicles, storage batteries for energy storage, robots, satellites, and the like, many studies are being made on high-performance secondary batteries that can be repeatedly recharged.

More recently, secondary batteries are being widely used in not only small devices such as portable electronic devices but also medium- and large-scale devices such as vehicles and energy storage systems. In particular, with the steady exhaustion of carbon energy and increasing interest in the environment, the demand for hybrid electric vehicles and electric vehicles is increasing all over the world including United States, Europe, Japan and the Republic of Korea. In such hybrid electric vehicles or electric vehicles, the most essential component is a battery pack that gives a driving power to an automobile motor. Because hybrid electric vehicles or electric vehicles are supplied with power for driving the vehicles through charging/discharging of battery packs, as compared to vehicles powered by an engine alone, they have higher fuel efficiency and can eliminate or lessen the emission of pollutants, and by this reason, the number of users is now increasing.

When a secondary battery is used for an electric vehicle, to increase the capacity and output, a battery pack is manufactured using battery modules in which many secondary batteries are connected in series and/or in parallel. In this instance, a pouch type secondary battery is widely used in medium- and large-scale devices because it is easy to stack.

Secondary batteries stacked side by side in a battery module or a battery pack may have electrode leads electrically connected to each other. In this instance, electrode leads of neighboring secondary batteries may be electrically connected by a bus bar, and a laser welding method is generally used to electrically connect the secondary batteries.

FIG. 1 is a schematic perspective view showing a laser welding process of conventional electrode leads. FIG. 2 is a schematic cross-sectional view illustrating laser welding of the electrode leads and a bus bar in the structure of FIG. 1.

Referring to FIGS. 1 and 2, secondary batteries 10 are stacked with electrode leads 20 of positive and negative electrodes protruding from two ends and the electrode leads 20 alternatingly stacked with opposite polarities. On one side of the stacked secondary batteries 10, the inner electrode leads 20 except the outermost electrode leads 20 are bent and overlap each other, and the bent electrode lead 20 parts are welded and joined by a laser L outputted from a laser generator S. On the other side of the stacked secondary batteries 10, all the electrode leads 20 are bent and the electrode lead 20 parts bent in overlapping manner are welded by a laser L outputted from the laser generator S, and thus electrical connection is completed.

Referring to FIG. 2 in more detail, the electrode lead 20 protrudes from the secondary battery 10, and is bent with the end bent to the left or right, providing a flat vertical contact surface. Neighboring secondary batteries 10 are welded through a laser L with the bent parts of the electrode leads 20 of opposite polarities overlapping and a bus bar 30 placed in contact with the vertical contact surface where the bent parts of the electrode leads 20 overlap.

Because components for vehicles are directly associated with the lives of persons in vehicles when faults occur due to accidents or malfunction, clients' level of safety requirement in finished vehicles is very high. Accordingly, stability test items of battery packs for electric vehicles become stricter. One of the items, a solution to a heat generation phenomenon when overcharged is particularly important. However, in the structure of welding between the electrode leads 20, and further, welding between the electrode leads 20 and the bus bar 30 as described with reference to FIGS. 1 and 2, there is no function to prevent a heat generation phenomenon when overcharged.

Additionally, the conventional welded connection as shown in FIGS. 1 and 2 has a disadvantage that when heat is generated by a fault in one secondary battery 10, an adjacent secondary battery 10 is influenced through the electrode lead 20, causing sequential problems.

Moreover, because the welded connection cannot be released once connection is established, the limitation is that it is impossible to separate in a non-destructive manner and replace with a new secondary battery when a fault occurs in any secondary battery 10.

DISCLOSURE

Technical Problem

The present disclosure is designed to solve the above-described problem, and therefore the present disclosure is directed to providing a battery module in which a connection structure between electrode leads is changed to prevent a heat generation phenomenon when overcharged and allow easy connection and disconnection between secondary batteries, and a method for manufacturing the same.

These and other objects and advantages of the present disclosure will be understood by the following description and will be apparent from the embodiments of the present disclosure. Further, it will be readily understood that the objects and advantages of the present disclosure are realized by the means set forth in the appended claims and combinations thereof.

Technical Solution

To achieve the above-described object, a battery module according to the present disclosure includes a secondary battery stack including a plurality of secondary batteries each extending in a vertical direction and having two electrode leads of opposite polarities, wherein the two electrode leads of each secondary battery protrude from the respective secondary battery, each electrode lead having a bent part extending in a horizontal direction perpendicular to the vertical direction, and the bent part of one of the electrodes of each of the secondary batteries is stacked with a washer and with the bent part of one of the electrodes of opposite polarity of an adjacent one of the secondary batteries, with an elastic body interposed between the bent parts of the adjacent ones of the secondary batteries, and with an insulating bolt compressing the elastic body and fastening the bent parts of the adjacent ones of the secondary batteries to one another.

In the battery module according to the present disclosure, a bus bar may be disposed below the stacked bent parts of the adjacent ones of the secondary batteries and is fastened to the stacked bent parts by the insulating bolt. In this instance, the bent parts and the bus bar of the adjacent ones of the secondary batteries each may have a bolt hole extending therethrough in the vertical direction, and the insulating bolt may be coupled with a nut below the bus bar and may extend through the washer and the bolt hole. Alternatively, the bent parts of the adjacent ones of the secondary batteries may have a bolt hole extending therethrough in the vertical direction and the bus bar may have a bolt tab, and the insulating bolt may be coupled to the bolt tab and may extend through the washer and the bolt hole.

The bolt hole may be formed at two or more places. The washer is preferably a PVC washer or a low temperature lead washer. The elastic body of the adjacent ones of the secondary batteries may have a ring shape and may extend around the insulating bolt, or may be disposed symmetrically on two opposite sides of the insulating bolt.

Preferably, the washer may be configured to melt when a temperature of the battery module exceeds a predetermined limit, and the elastic body may become uncompressed and may force apart the bent parts of the adjacent ones of the secondary batteries, thereby creating a gap between the stacked bent parts and breaking an electrical connection between the stacked bent parts.

In a method for manufacturing a battery module according to the present disclosure, a plurality of secondary batteries each having two electrode leads of opposite polarities, each lead having a bolt hole extending therethrough is prepared. An end of each of the electrode leads is bent in a horizontal direction. The bent part of one of the electrodes of each of the secondary batteries are stacked with a washer and with the bent part of one of the electrodes of opposite polarity of an adjacent one of the secondary batteries, with an elastic body interposed between the bent parts of the adjacent ones of the secondary batteries such that the bolt holes are aligned. Subsequently, the bent parts of the adjacent ones of the secondary batteries and the washer are fastened to one another by an insulating bolt extending through the bolt hole and compressing the elastic body.

At least one battery module according to the present disclosure may be combined to manufacture a battery pack. The battery pack may be applied to a vehicle.

Advantageous Effects

According to the present disclosure, connecting by means of bolts rather than welding is applied to electrical connection between electrode leads of a lithium ion battery module for vehicle or electrical connection between positive electrode lead-negative electrode lead-bus bar. Because secondary batteries are connected by means of bolts, connection/disconnection of the secondary batteries is easy and the reuse of the disconnected secondary batteries is possible.

In the present disclosure, electrode lead bent parts are connected to a bus bar using an insulating bolt and a washer with an elastic body interposed between. When heat is generated from the secondary battery, the washer melts and the distance between the electrode leads increases by the elastic body between the electrode leads, and thus the electrical connection is disconnected. Accordingly, by disconnecting the electrical connection between electrode leads in the event of heat generation, there are effects in preventing subsequent problems from occurring, and effectively preventing a heat generation phenomenon when overcharged.

BRIEF DESCRIPTION OF THE DRAWINGS

The accompanying drawings illustrate preferred embodiments of the present disclosure, and together with the following detailed description, serve to provide further understanding of the technical aspects of the present disclosure, and thus, the present disclosure should not be construed as being limited to the drawings.

MODE FOR CARRYING OUT THE INVENTION

Figure 1:
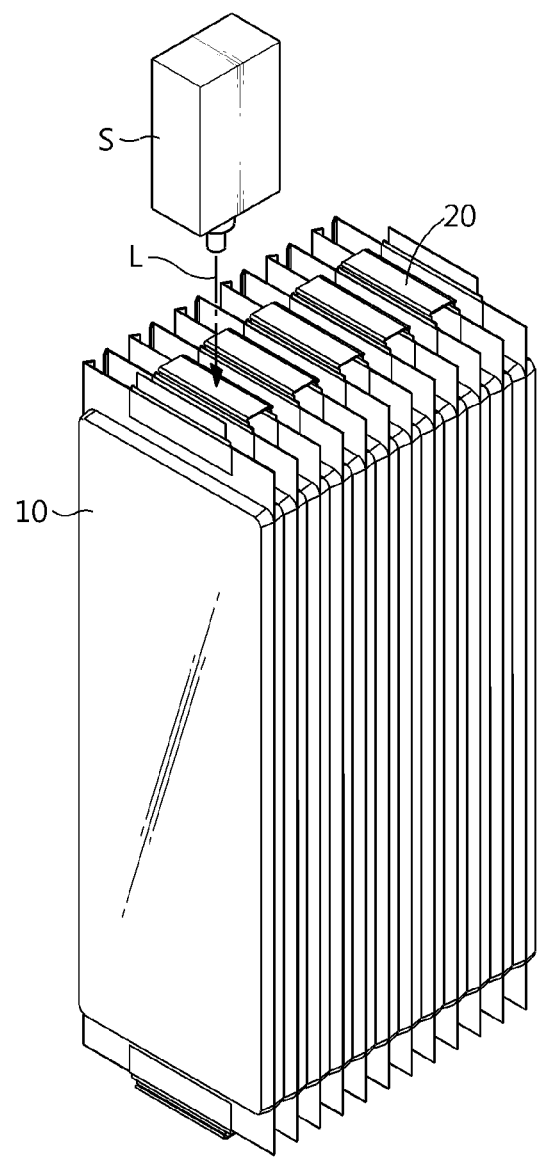
FIG. 1 is a schematic perspective view showing a laser welding process of conventional electrode leads.
Figure 2:
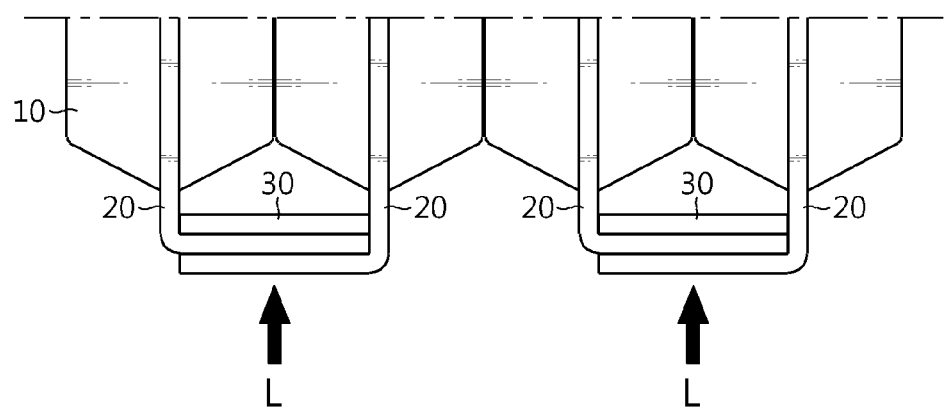
FIG. 2 is a schematic cross-sectional view illustrating laser welding of electrode leads and a bus bar in the structure of FIG. 1.

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time the application was filed.

Figure 3:
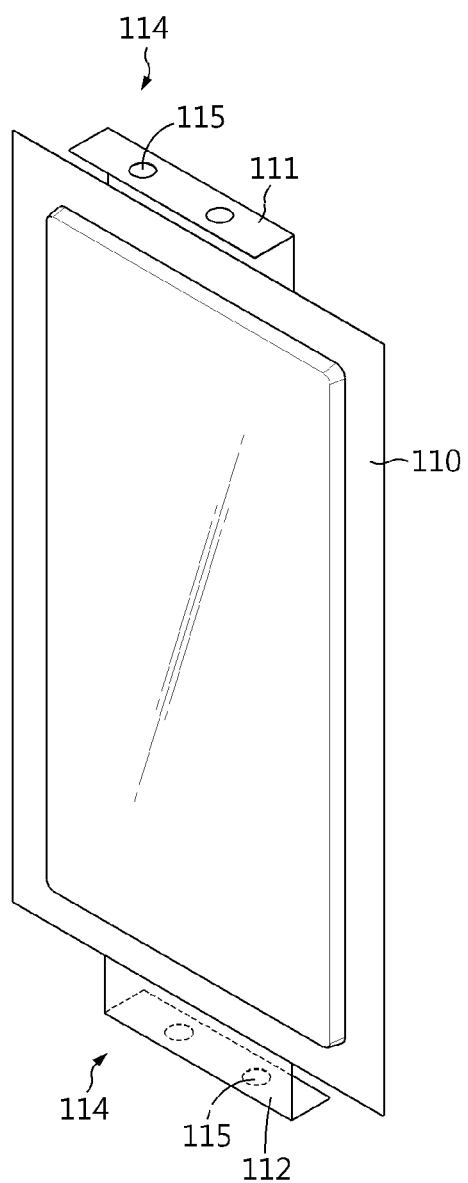
FIG. 3 is a perspective view of a secondary battery included in a battery module according to an embodiment of the present disclosure.

FIG. 3 is a perspective view of a secondary battery included in a battery module according to an embodiment of the present disclosure.

As shown in FIG. 3, the secondary battery 110 has flat positive electrode lead 111 and negative electrode lead 112, and the electrode leads 111, 112 protrude in opposite directions from the secondary battery 110. Additionally, the electrode leads 111, 112 has each end bent to the left or right, for example, in the shape of the letter L, to form a bent part 114 that provides a flat vertical contact surface. The secondary battery 110 is preferably a pouch type secondary battery having an advantage that it is easy to stack for use in medium- and large-scale devices.

Specifically, when a direction in which the positive electrode lead 111 and the negative electrode lead 112 of the secondary battery 110 extend is a vertical (up/down) direction, and a direction in which their ends are bent is left/right direction, the positive electrode lead 111 and the negative electrode lead 112 protrude in up/down opposite directions from the body of the secondary battery 110 respectively, and their ends are bent in the shape of the letter L facing left/right opposite directions. Additionally, the bent part 114 of the electrode lead 111, 112, i.e., the L-shaped bottom has a bolt hole 115 into which an insulating bolt (200 in FIG. 5) as described below is inserted and passes through. The bolt hole 115 may be formed at two or more places as shown in FIG. 3. When the bolt hole 115 is formed at two or more places, the bolt holes 115 may be arranged along the lengthwise direction (horizontal direction, or front/back direction in the drawing) of the electrode lead 111, 112.

Figure 4:
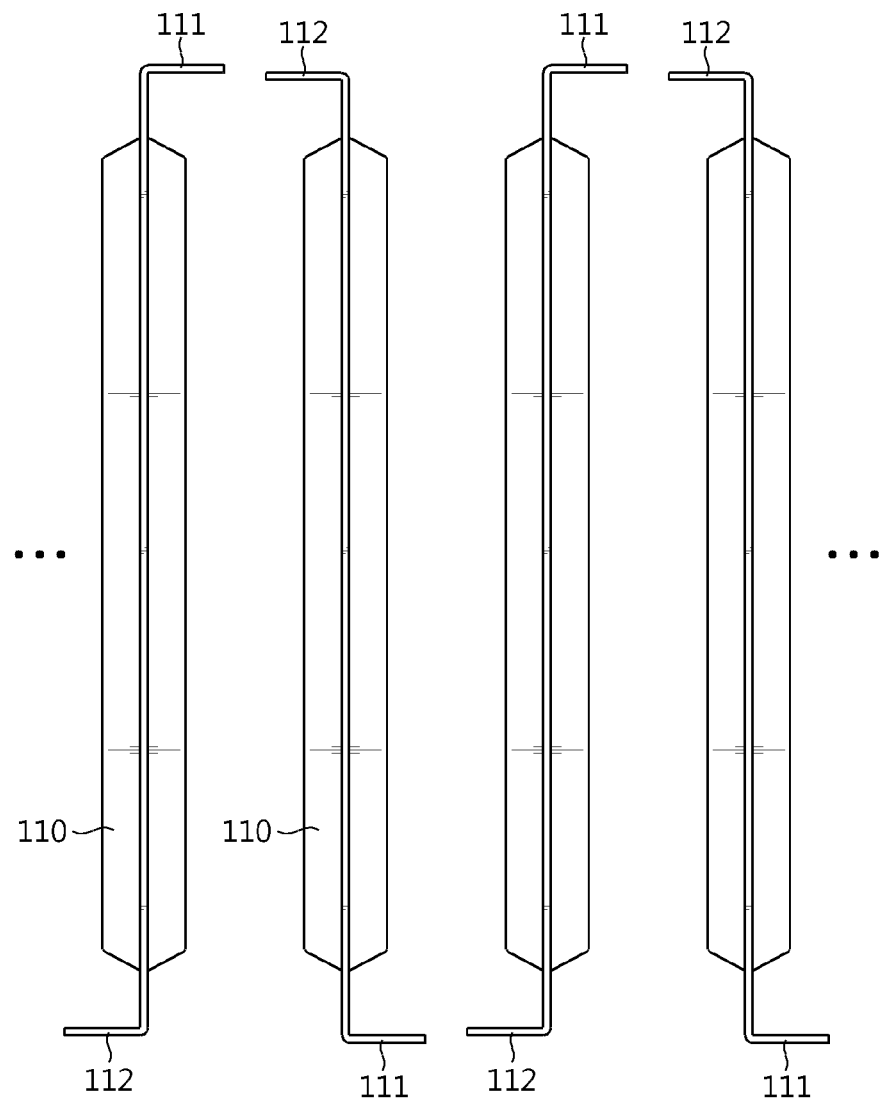
FIG. 4 is a diagram showing the arrangement of the secondary batteries shown in FIG. 3.
Figure 5:
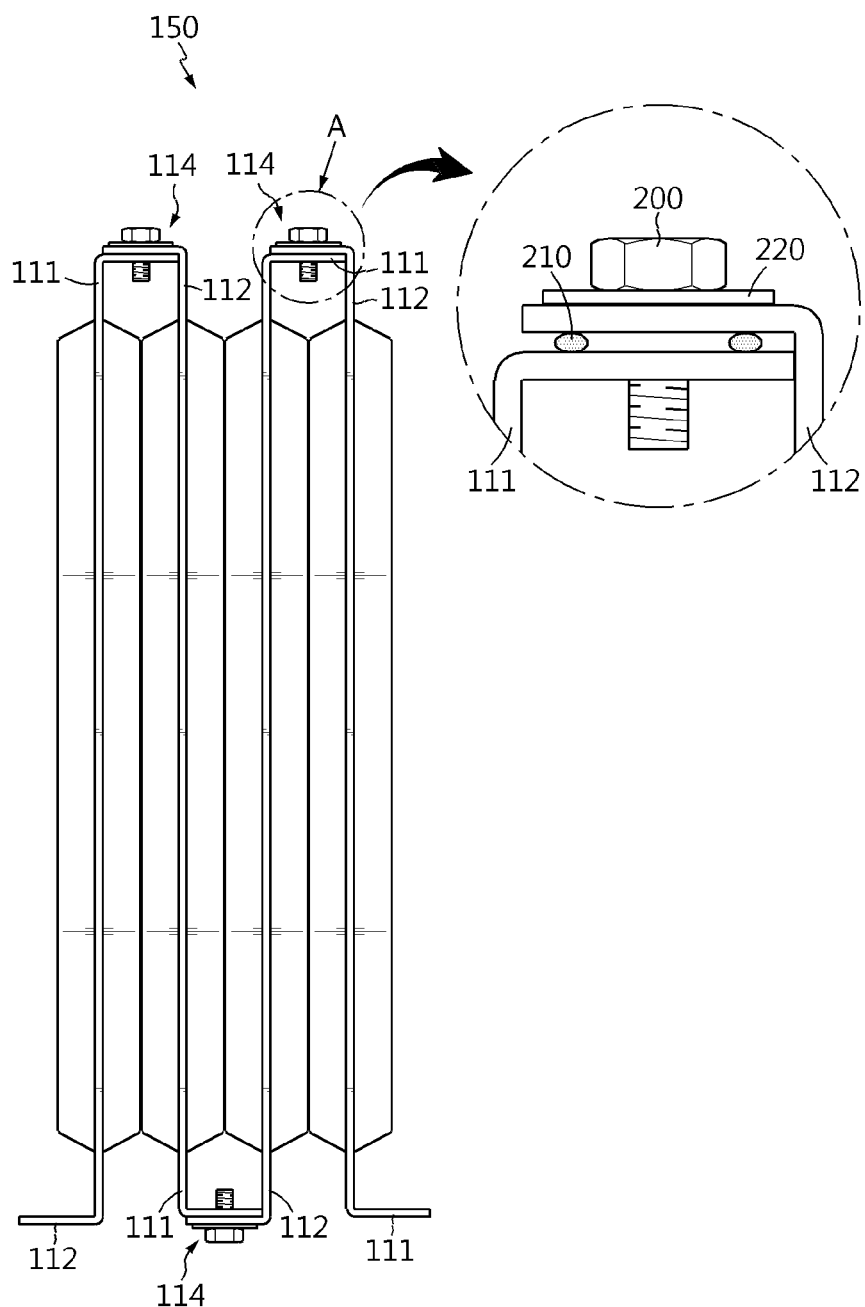
FIG. 5 is a side view showing a connection structure of the secondary batteries of FIG. 4.

FIG. 4 is a diagram showing the arrangement of the secondary batteries shown in FIG. 3, and FIG. 5 is a side view showing a connection structure of the secondary batteries of FIG. 4.

Referring to FIGS. 4 and 5, an arbitrary number of secondary batteries 110 are stacked to form a secondary battery stack. Additionally, each secondary battery 110 is connected in series in the stack order and integrated into a battery module 150. As described above, the positive electrode lead 111 and the negative electrode lead 112 of each secondary battery 110 are respectively bent in left/right opposite directions. Two adjacent secondary batteries 110 are arranged such that each of the positive electrode lead 111 of one side and the negative electrode lead 112 the other side protrudes in the same up/down direction, and at the same time, the ends 114 are positioned facing left/right opposite directions. Additionally, the neighboring secondary batteries 110 have the bent parts 114 of the electrode leads 111, 112 of opposite polarities stacked at the L-shaped bottom as previously mentioned. It is characterized in that an elastic body 210 is interposed between the stacked bent parts 114. Additionally, the neighboring secondary batteries 110 are connected in series by fastening the stacked part with the insulating bolt 200 including a washer 220. The insulating bolt 200 compresses the elastic body 210 to electrically connect the electrode leads 111, 112. As the insulating bolt 200 itself does not form an electrical connection path, there is no electrical short problem caused by the bolt 200.

The electrode lead 111, 112 is an electrical conductor, and usually uses metal. The electrode lead 111, 112 of metal is elastic to some extent, but not plastic. Accordingly, as the bolt 200 is installed, a partial stress by a height difference between a part where the elastic body 210 is interposed and a part where the elastic body 210 is not interposed is received in a material (in serious cases, bend). Although FIG. 5 shows that the electrode leads 111, 112 do not bend when fastened, the present disclosure is not limited thereto.

Figure 6:
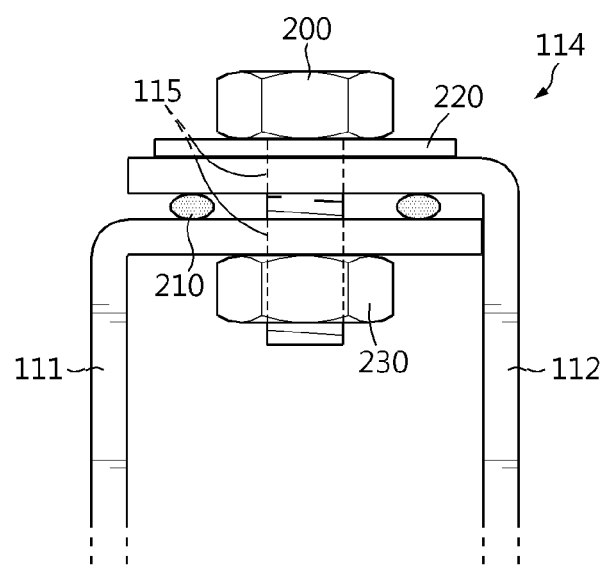
FIG. 6 is an enlarged view of section A in FIG. 5, showing connection between electrode leads according to a first embodiment.

FIG. 6 is an enlarged view of section A in FIG. 5, showing connection between the electrode leads according to a first embodiment.

Referring to FIG. 6, the bolt holes 115 formed in each bent part 114 formed in the electrode leads 111, 112 are arranged in up/down direction and front/back direction, and with the elastic body 210 interposed between the stacked bent parts 114, the insulating bolt 200 is inserted through the washer 220 placed on the bolt hole 115 and coupled with a nut 230 below the bent part 114. Accordingly, the neighboring stacked secondary batteries 110 may have an electrical interconnection of the electrode leads 111, 112.

When at least two bolt holes 115 are formed in each of the positive electrode lead 111 of one side and the negative electrode lead 112 of the other side, the bolt 200 is inserted into each hole, so the corresponding number of nuts 230 may be needed. When a nut plate structure designed to receive many bolts is applied instead of a nut structure designed to receive only one bolt, the number of components may be reduced. In addition, a pair of electrode leads 111, 112 may be fastened by a rivet without using a nut plate.

Figure 7:
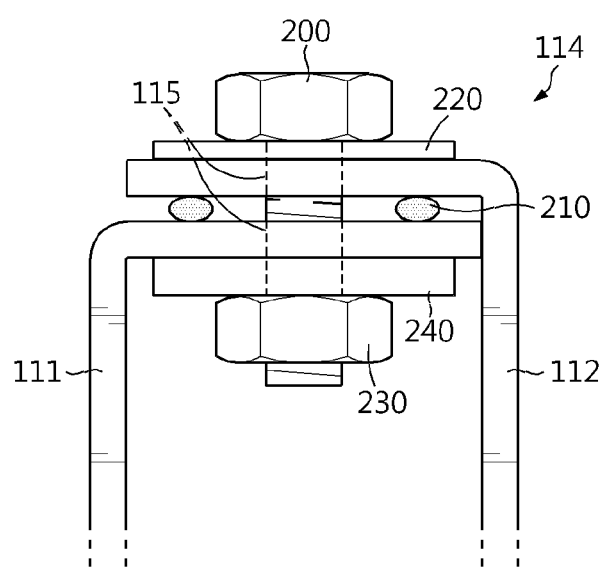
FIG. 7 is an enlarged view of section A in FIG. 5, showing connection of a positive electrode lead-a negative electrode lead-a bus bar according to a second embodiment.

FIG. 7 is an enlarged view of section A in FIG. 5, showing connection of the positive electrode lead-the negative electrode lead-the bus bar according to a second embodiment.

Referring to FIG. 7, a bus bar 240 is disposed below the stacked bent parts 114. The bus bar 240 also has the bolt hole 115, and the bolt hole 115 formed in the bent parts 114 and the bolt hole 115 formed in the bus bar 240 are aligned. The elastic body 210 is interposed between the stacked bent parts 114, and the insulating bolt 200 is inserted through the washer 220 above the bolt hole 115 and coupled with the nut 230 below the bus bar 240 below the bent parts 114. The neighboring stacked secondary batteries 110 may have an electrical interconnection between the electrode leads 111, 112 as well as an electrical connection to the bus bar 240.

Figure 8:
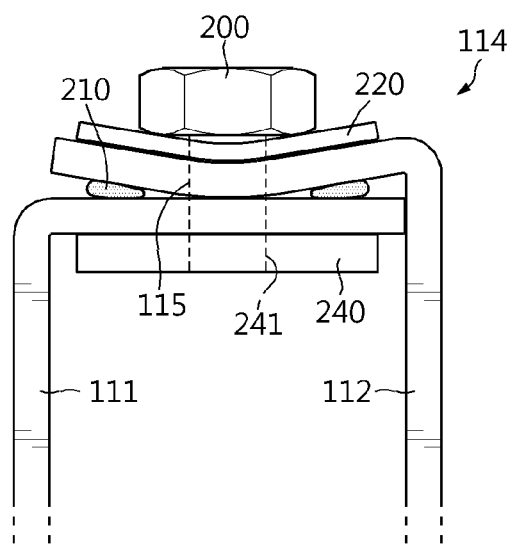
FIG. 8 is an enlarged view of section A in FIG. 5, showing connection of a positive electrode lead-a negative electrode lead-a bus bar according to a third embodiment.
Figure 9:
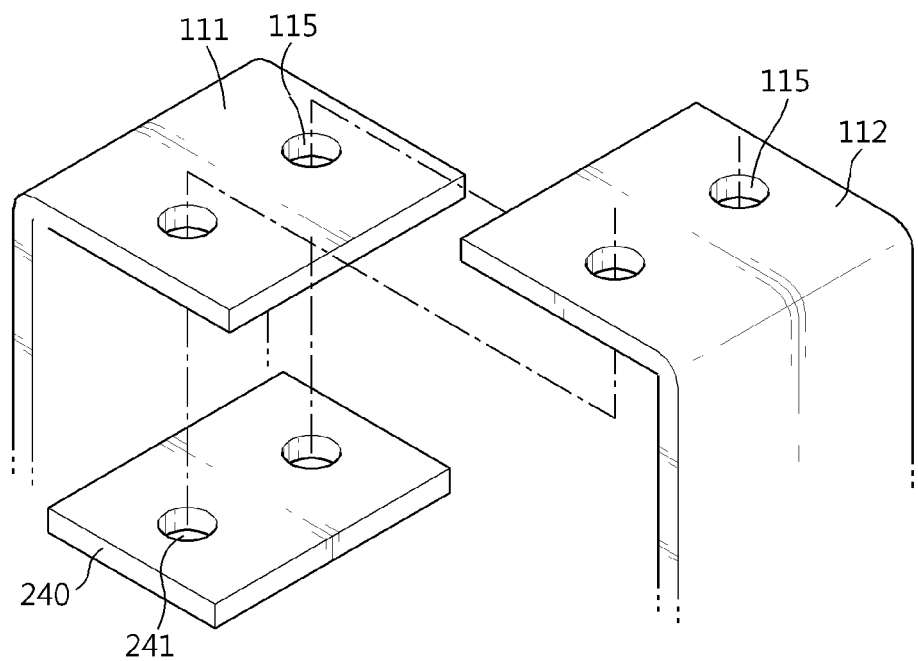
FIG. 9 is an exploded view of the components of the embodiment of FIG. 8.

FIG. 8 is an enlarged view of section A in FIG. 5, showing connection of the positive electrode lead-the negative electrode lead-the bus bar according to a third embodiment. FIG. 9 is an exploded view of the components of the embodiment of FIG. 8.

Referring to FIG. 8, the bus bar 240 is disposed below the stacked bent parts 114. As shown in FIG. 9, the bus bar 240 has a bolt tab 241. The bolt hole 115 formed in the bent parts 114 and the bolt tab 241 formed in the bus bar 240 are aligned, the elastic body 210 is interposed between the stacked bent parts 114, the insulating bolt 200 is inserted through the washer 220 above the bolt hole 115 and coupled to the bolt tab 241 in the bus bar 240 below the bent parts 114. Accordingly, the neighboring stacked secondary batteries 110 may have an electrical interconnection of the electrode leads 111, 112 as well as an electrical connection to the bus bar 240, and does not need any other component such as a nut below the bus bar 240, making assembly and component management easy. Although FIG. 8 shows that the electrode leads 111, 112 are bent by fastening and the elastic body 210 is pressed with exaggeration, the present disclosure is not limited thereto.

The battery module 150 according to the present disclosure may be a medium- and large-scale battery such as a lithium ion battery module for electric vehicle. As described with reference to FIGS. 6 to 8, the primary feature of the present disclosure is that connection by means of the bolt 200 rather than welding is applied to electrical connection between the electrode leads 111, 112 of the battery module 150 or electrical connection between the positive electrode lead 111-the negative electrode lead 112-the bus bar 240. Because the secondary batteries 110 are connected by the bolt 200, connection/disconnection of the secondary batteries 110 is easy and the reuse of the disconnected secondary batteries 110 is possible.

Additionally, the secondary feature of the present disclosure is that the electrode lead bent parts 114 are connected using the insulating bolt 200 and the washer 220 with the elastic body 210 interposed between.

Figure 10:
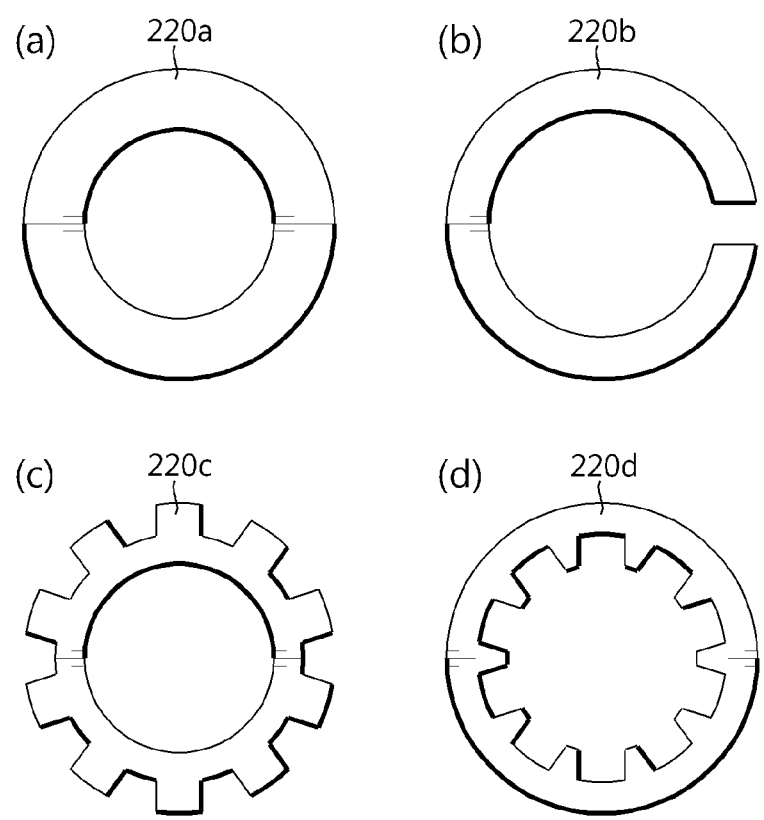
FIG. 10 shows various examples of a washer included in a battery module according to the present disclosure.

FIG. 10 shows various examples of the washer 220 included in the battery module 150 according to the present disclosure. In FIG. 10, (a) is a flat washer 220a, (b) is a lock washer 220b, (c) is an external tooth washer 220c, and (d) is an internal tooth washer 220d.

In general, a washer refers to a ring-shaped component that is inserted between the nut and the bolt and a target to distribute the coupling pressure. The flat washer 220a of (a) is placed below the head of the bolt 200 to distribute the pressure to protect the work surface. The lock washer 220b of (b) is a slightly spiral washer, and may act as a spring to prevent the bolt 200 from loosening. The external tooth washer 220c of (c) is a washer with teeth (protrusions) attached to the outside thereof to allow the bolt 200 to be safely tightened and prevent the bolt 200 from being loosened. The internal tooth washer 220d of (d) is a washer with protrusions on the inside thereof to allow the bolt 200 to be safely tightened and prevent the bolt 200 from being loosened in the same way as the external tooth washer. The combined structure of the external tooth washer 220c and the internal tooth washer 220d, i.e., with protrusions on the inside and outside may be used.

Particularly, the washer 220 included in the battery module 150 according to the present disclosure is a component that not only acts as a general washer but also is necessary to release the electrical connection between the electrode leads 111, 112 or between the electrode leads 111, 112 and the bus bar 240 in the event of heat generation. The material for the washer 220 is selected such that the washer 220 maintains the application of the pressure to the elastic body 210 together with the bolt 200 when in its normal state, and in the event of heat generation from the secondary battery 110, melts and completely fuses or changes the shape (thickness). When the washer 220 melts and has a thickness change due to heat generation from the secondary battery 110, the pressed state is released as much, and thus the pressed elastic body 210 tends to return to the original shape. In view of this point, the washer 220 is preferably a PVC washer or a low temperature lead washer. The maximum use temperature available without deformation of the PVC washer is 60° C. Accordingly, when the temperature reaches about 60° C. due to heat generation from the secondary battery 110, deformation of the PVC washer occurs and the restoring force of the elastic body 210 is generated, and the present disclosure releases the electrical connection between the electrode leads 111, 112, or between the electrode leads 111, 112 and the bus bar 240 using the restoring force. The low temperature lead washer is also known as Wood's metal.

It is a bismuth alloy, and is one of the most widely known fusible alloys. Its typical formula is 40~50% bismuth (Bi), 25~30% lead (Pb), 12.5~15.5% tin (Sn) and 12.5% cadmium (Cd), and the standard composition is known as Bi:Pb:Sn:Cd=4:2:1:1. The melting point of the low temperature lead washer may be adjusted by adjusting the composition. The present disclosure preferably uses a low temperature lead washer including 50% Bi, 24% Pb, 14% Sn and 12% Cd. The melting point of the low temperature lead washer of this formula is 70° C. Accordingly, the maximum use temperature available without deformation of the low temperature lead washer is 70° C., and when the temperature reaches about 70° C. due to heat generation from the secondary battery 110, deformation of the low temperature lead washer occurs and a restoring force of the elastic body 210 is generated, and the present disclosure releases the electrical connection between the electrode leads 111, 112, or between the electrode leads 111, 112 and the bus bar 240 using the restoring force.

Figure 11:
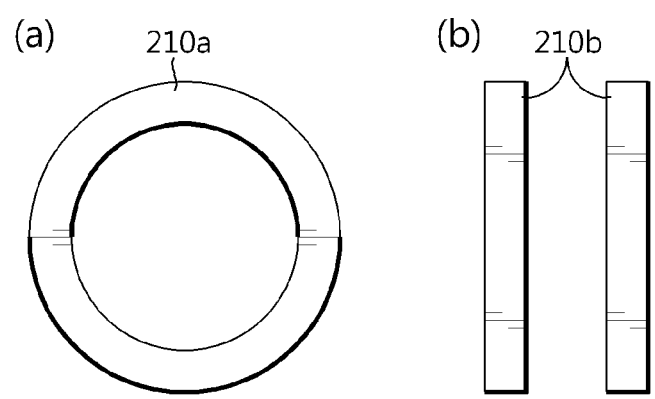
FIG. 11 shows various examples of an elastic body included in a battery module according to the present disclosure.

FIG. 11 shows various examples of the elastic body 210 included in the battery module 150 according to the present disclosure. (a) is an elastic body 210a in the shape of a ring, and (b) is an elastic body 210b in the shape of a pair of bands (or a pattern such as dots). The elastic body 210a in the shape of a ring may be disposed between the bent parts 114 such that the inside hole part is aligned with the bolt hole 115 formed in the bent parts 114. The elastic body 210b in the shape of a pair of bands (or dots) may be symmetrically disposed on two sides of the bolt 200. In terms of operation easiness and component management, the elastic body 210a in the shape of a ring is advantageous.

The elastic body 210 is an object with elasticity or property that tends to return to the original shape when an external force is removed after the object is deformed by the force. The elastic body 210 is in pressed state by the bolt 200 and the washer 220, and when the washer 220 deforms, the restoring force to the original state acts. The elastic body 210 may be a polymer material exhibiting rubber elasticity, an elastic fiber and a foam, and preferably is a material that does not melt at high temperature as opposed to the washer 220.

Figure 12:
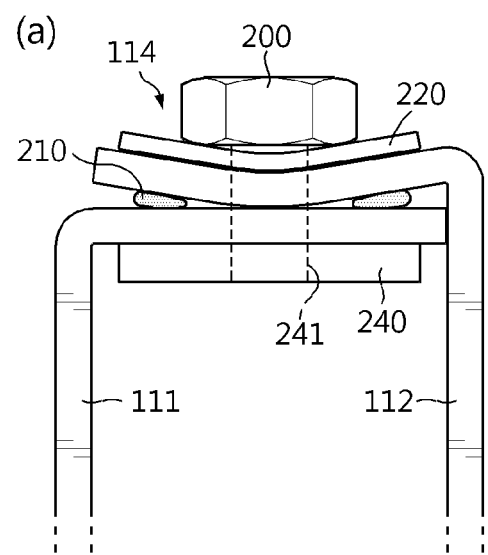
FIG. 12 is a diagram illustrating the principle that electrical connection is released in the event of heat generation from a secondary battery in a battery module according to the present disclosure.
Figure 12:
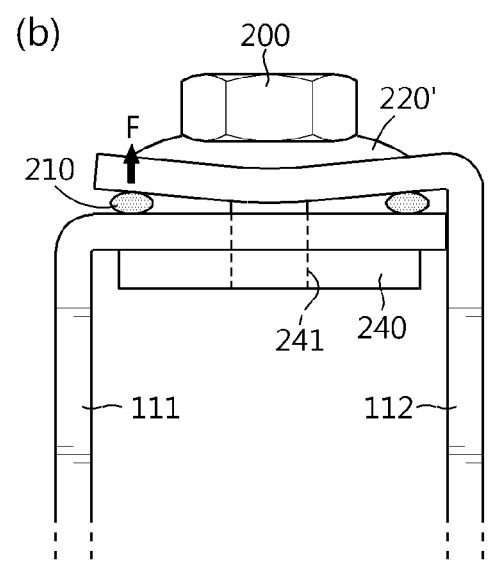

FIG. 12 is a diagram illustrating the principle that electrical connection is released in the event of heat generation from the secondary battery in the battery module according to the present disclosure, showing an example of structure in which a bus bar has a bolt tab and a bolt is installed among the above-described embodiments.

(a) of FIG. 12 is a diagram showing the normal state after the battery module 150 is assembled as described with reference to FIGS. 5 and 7. In compressed state of the elastic body 210, the electrode leads 111, 112 and the bus bar 240 are electrically connected by the bolt 200. When a change in environment of the battery module 150 occurs due to an event such as of the secondary battery 110, the washer 220 melts and becomes a deformed washer 220' as shown in (b). In this instance, the compressed state of the elastic body 210 is released in part or in whole and the gap between the stacked bent parts 114 is broadened by a repulsive force F acting upward by the restoring force of the elastic body 210, and thus the electrical connection between the electrode leads 111, 112 and the bus bar 240 is completely released. As described above, in the event of heat generation, the electrical connection between the electrode leads 111, 112 and the bus bar 240 may be disconnected, thereby preventing subsequent problems from occurring, and effectively preventing an ignition phenomenon when overcharged.

As described above, the battery module 150 according to the present disclosure uses the elastic body 210 between the electrode leads 111, 112 to release the electrical connection between the electrode leads 111, 112 through the restoring force of the elastic body 210 in the event of heat generation from the secondary battery 110.

Meanwhile, a battery pack including at least one battery module 150 described above may be manufactured. In this instance, in addition to the battery module, the battery pack may further include a case for receiving the battery module and various types of device for controlling the charge/discharge of the battery module, for example, a BMS, a current sensor and a fuse. The battery module or the battery pack according to the present disclosure may be applied to vehicles such as electric vehicles or hybrid electric vehicles.

Hereinafter, the embodiment of a method for manufacturing the above-described battery module according to the present disclosure will be described in brief.

Figure 13:
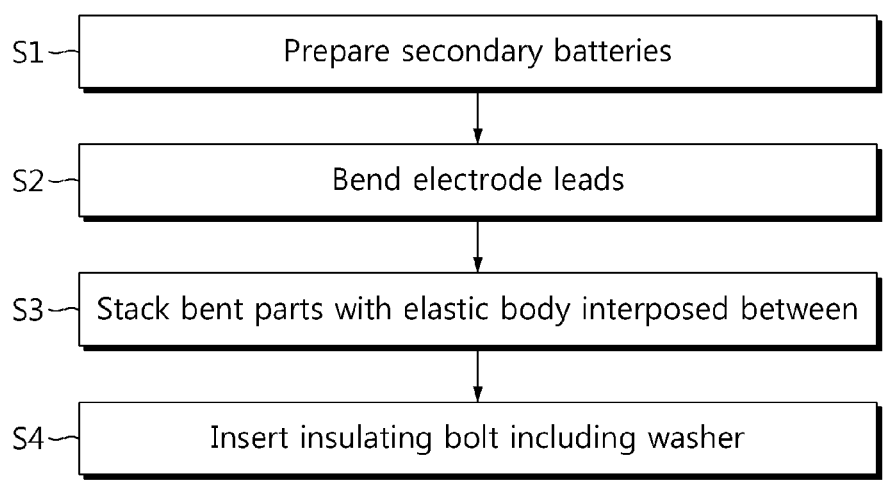
FIG. 13 is a flowchart of a method for manufacturing a battery module according to the present disclosure.

FIG. 13 is a flowchart of a method for manufacturing a battery module according to the present disclosure. A description will be provided based on the method according to the third embodiment described with reference to FIGS. 8 and 9.

First, a plurality of secondary batteries 110 having the electrode leads 111, 112 with the bolt holes 115 is prepared (S1). An electrode lead component with the pre-formed bolt hole 115 may be prepared and used to manufacture the secondary battery 110, and after the secondary battery 110 is manufactured using a general electrode lead component, the bolt hole 115 may be formed by punching the electrode lead.

The end 114 of the electrode lead 111, 112 is bent to the left or right to form the bent part 114 (S2, see FIG. 3).

Subsequently, the bent parts 114 of neighboring secondary batteries 110 are stacked such that the bolt holes 115 are aligned with the elastic body 210 interposed between the bent parts 114 of the electrode leads of opposite polarities (S3, see FIG. 5).

Subsequently, the insulating bolt 200 including the washer 220 passes through the bolt hole 115 and fastens the corresponding stack part while compressing the elastic body 210 (S4, see FIG. 8). In this instance, the bus bar 240 including the bolt tab 241 is prepared below the bent parts 114 and coupled together by the bolt 200 to manufacture the battery module 150 as shown in FIG. 8.

The terms indicating directions as used herein such as up, down, left and right are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A battery module comprising:
   a secondary battery stack including a plurality of stacked secondary batteries each extending in a vertical direction and having two electrode leads of opposite polarities,
   wherein the two electrode leads of each secondary battery protrude from the respective secondary battery, each electrode lead having a bent part extending in a horizontal direction perpendicular to the vertical direction, and the bent part of one of the electrodes of each of the secondary batteries is stacked with a washer and with the bent part of one of the electrodes of opposite polarity of an adjacent one of the secondary batteries, with an elastic body interposed between the bent parts of the ones of the electrodes of the adjacent ones of the secondary batteries, and with an insulating bolt compressing the elastic body and fastening the bent parts of the ones of the electrodes of the adjacent ones of the secondary batteries to one another.

2. The battery module according to claim 1, wherein a bus bar is disposed below the stacked bent parts of the adjacent ones of the secondary batteries and is fastened to the stacked bent parts by the insulating bolt.

3. The battery module according to claim 2, wherein the bent parts and the bus bar of the adjacent ones of the secondary batteries each have a bolt hole extending therethrough in the vertical direction, and the insulating bolt is coupled with a nut below the bus bar and extends through the washer and the bolt hole.

4. The battery module according to claim 2, wherein the bent parts of the adjacent ones of the secondary batteries have a bolt hole extending therethrough in the vertical direction and the bus bar has a bolt tab, and the insulating bolt is coupled to the bolt tab and extends through the washer and the bolt hole.

5. The battery module according to claim 1, wherein the elastic body of the adjacent ones of the secondary batteries has a ring shape and extends around the insulating bolt.

6. The battery module according to claim 1, wherein the elastic body of the adjacent ones of the secondary batteries is disposed symmetrically on two opposite sides of the insulating bolt.

7. The battery module according to claim 1, wherein the washer is configured to melt when a temperature of the battery module exceeds a predetermined limit, and the elastic body becomes uncompressed and forces apart the bent parts of the adjacent ones of the secondary batteries, thereby creating a gap between the stacked bent parts and breaking an electrical connection between the stacked bent parts.

8. A method for manufacturing a battery module, comprising:
   preparing a plurality of secondary batteries each having two electrode leads of opposite polarities, each lead having a bolt hole extending therethrough;
   bending an end of each of the electrode leads in a horizontal direction;
   stacking the bent part of one of the electrodes of each of the secondary batteries with a washer and with the bent part of one of the electrodes of opposite polarity of an adjacent one of the secondary batteries, with an elastic body interposed between the bent parts of the ones of the electrodes of the adjacent ones of the secondary batteries such that the bolt holes are aligned; and
   fastening the bent parts of the ones of the electrodes of the adjacent ones of the secondary batteries and the washer to one another with an insulating bolt extending through the bolt hole and compressing the elastic body.

9. The method for manufacturing a battery module according to claim 8, wherein a bus bar is disposed below the stacked bent parts of the adjacent ones of the secondary batteries and is fastened to the stacked bent parts by the insulating bolt.

10. The method for manufacturing a battery module according to claim 9, wherein the bus bar of the adjacent ones of the secondary batteries each has a bolt hole extending therethrough in a vertical direction perpendicular to the horizontal direction, and the insulating bolt is coupled with a nut below the bus bar and extends through the washer and the bolt hole.

11. The method for manufacturing a battery module according to claim 9, wherein the bus bar of the adjacent ones of the secondary batteries each has a bolt tab, and the insulating bolt is coupled to the bolt tab and extends through the washer and the bolt hole.

12. The method for manufacturing a battery module according to claim 8, wherein the elastic body of the adjacent ones of the secondary batteries has a ring shape and extends around the insulating bolt.

13. The method for manufacturing a battery module according to claim 8, wherein the elastic body of the adjacent ones of the secondary batteries is disposed symmetrically on two opposite sides of the insulating bolt.

14. The method for manufacturing a battery module according to claim 8, wherein when a temperature of the battery module exceeds a predetermined limit, the washer melts and the elastic body is uncompressed and forces apart the bent parts of the adjacent ones of the secondary batteries, thereby creating a gap between the stacked bent parts and breaking an electrical connection between the stacked bent parts.

* * * * *